United States Patent [19]

Schaefer

[11] 4,045,196

[45] Aug. 30, 1977

[54] METHOD AND APPARATUS FOR CHOPPING GLASS STRANDS

[75] Inventor: William L. Schaefer, Gibsonia, Pa.

[73] Assignee: PPG Industries, Inc., Pittsburgh, Pa.

[21] Appl. No.: 730,103

[22] Filed: Oct. 6, 1976

[51] Int. Cl.² .................................................. C03B 37/02
[52] U.S. Cl. ........................................ 65/2; 65/11 R; 83/347; 83/659; 83/913
[58] Field of Search .................. 65/2, 11 R, 93 R; 83/347, 659, 913

[56] References Cited

U.S. PATENT DOCUMENTS

| 2,405,598 | 8/1946 | Miller | 83/659 X |
| 3,508,461 | 4/1970 | Stream | 83/347 X |
| 3,644,109 | 2/1972 | Klink et al. | 65/11 R |

Primary Examiner—Robert L. Lindsay, Jr.
Attorney, Agent, or Firm—Alan T. McDonald; John E. Curley

[57] ABSTRACT

A method and apparatus for the chopping of glass strands is disclosed. The back-up or cot roller for the chopping blades includes an annular cutting surface or ring which is mounted on an expandable wheel, such as an inflatable wheel. By varying fluid pressure within the inflatable wheel, variations in the resiliency of the cutting surface are realized. This allows for a smoother operation of the chopping system and increases the life of the cutting surface. Further, the expandable wheel around which the cutting surface rides will adapt for variations in the thickness of the annular cutting surface and still give a consistent mesh with the cutting blades. Thus, it is now possible to employ cutting rings having inconsistent inner and outer diameters and to resurface the cutting surface by grinding that portion of the surface which has been partially gouged by the cutting blades to an even surface once again and thus to reuse the cutting ring. This reduces replacement costs for the annular cutting surface rings or cots by further increasing their life expectancy, thus improving the efficiency of the chopping system.

14 Claims, 2 Drawing Figures

METHOD AND APPARATUS FOR CHOPPING GLASS STRANDS

BACKGROUND OF THE INVENTION

Continuous glass strands are typically chopped into particulate glass strands for use in reinforcing plastics and the like by passing the strands between a pair of rollers. One of these rollers includes a plurality of cutting blades spaced around its circumference. The other roller, known as a back-up or cot roll, provides an annular cutting surface such that the blades cut through the glass strand and into the back-up surface. Typical of such a chopping operation is U.S. Pat. No. 3,869,268, which is assigned to the assignee of the present invention and which is incorporated herein by reference.

As disclosed in the aforementioned patent, the back-up or cot roll has as its face an annular cutting surface or ring formed of a resilient material such as natural or synthetic rubber, polyurethanes and the like. The surface of this ring has a Shore A hardness preferably of about 50 to 90. In actuality, the surface is a ring or donut of the resilient material which surrounds a metal wheel and which is enclosed by face plates on the sides of the wheel.

As the cutting blades chop the strand and gouge into the cutting surface, the cutting surface quickly deteriorates. Thus, for example, these rings must be replaced at a rate of about once every two to eight hours, depending upon the individual wear for a given surface and the amount of downtime for a given chopper. Since the ring or donut must both sit firmly on the wheel and must provide for a proper degree of contact or mesh with the chopping blades, both the inner and outer diameters of the ring are critical. Thus, if the inner diameter of the ring is too large or too small, it will not fit properly on the wheel and must be discarded. In addition, if the outer diameter does not properly mesh with the cutting blades, glass strand will not be chopped properly. Because of this second problem, it has been impossible in the past to resurface used rings to increase the total life of the rings and thus decrease the cost of cutting rings for the chopper.

For example, it has been found that proper cutting of the strands may be accomplished when the cot roll and the cutting wheel surface, from which the blades extend, are in contact or spaced up to the length of the projection of the blades from the cutting wheel surface.

It is thus a primary objective of the present invention to enable cutting rings having heretofore unusable inner and outer diameters to be employed in the chopping of glass strands.

It is also a primary objective of the present invention to increase the life of the rings by decreasing their rate of wear and by enabling resurfacing and reuse of the rings.

It is a further objective of the present invention to provide for a smoother operation of the chopping system.

THE PRESENT INVENTION

By means of the present invention, these objects are obtained. The present invention concerns a core for the cot rings which will both allow for varying inner and outer diameters of the rings and which will enable the resiliency of the rings to be varied by exerting pressure on the rings to a desired degree. This is carried out by providing an expandable wheel around which the cot ring is carried. The expandable wheel may be, for example, a hollow rubber wheel and the like which is expanded by inflating it under fluid pressure. This wheel can both adapt to various inner diameters of the cot ring and expand the cot ring to acceptable outer diameters. This wheel may also exert different pressures on the cot ring to vary the resiliency of the ring as desired. This will decrease wear and thus increase the useful life of the rings and allow for a smoother operation of the chopping system.

BRIEF DESCRIPTION OF THE DRAWINGS

The apparatus of the present invention will be more fully described with reference to the drawings in which.

DETAILED DESCRIPTION OF THE DRAWINGS

Figure 1:
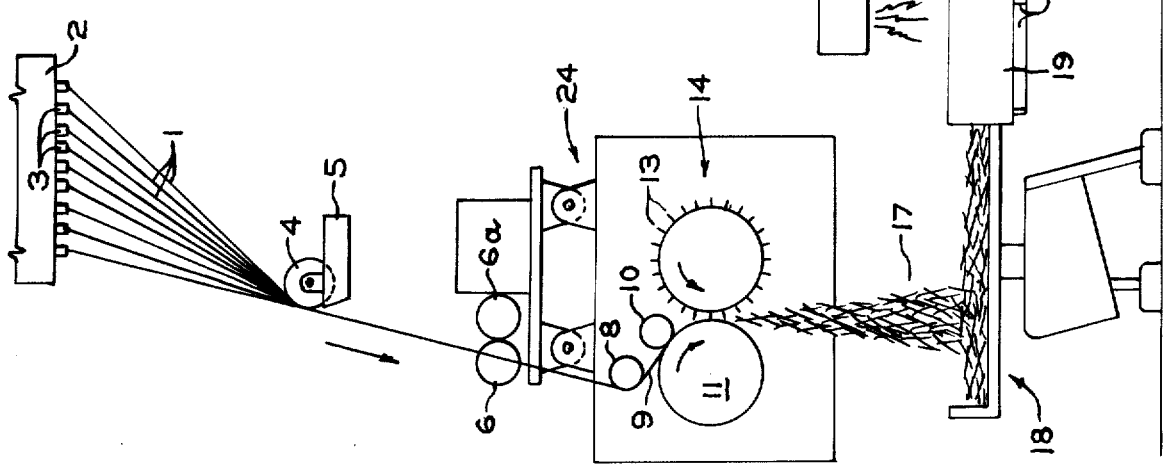
FIG. 1 is a diagrammatic representation of a glass strand chopping operation employing the method and apparatus of the present invention.

Turning to FIG. 1, glass filaments 1 are attenuated through bushing tips 3 at the bottom at a heated glass fiber forming bushing 2 containing molten glass. The filaments 1 then are passed across the application surface 4 of an applicator 5 where they are coated with a binder and/or size. The filaments 1 are then passed within grooves of a gathering shoe 8 where they are gathered into a plurality of strands 9. The gathering shoe 8 is a wheel or cylinder formed of a material such as graphite having a plurality of grooves in its surface within which the filaments 1 are gathered into strands 9. The strands 9 are then pulled between feed roll 10 and cot roll 11. These rollers produce the attenuative forces necessary to form the filaments 1 and align the strands 9 for chopping. Strands 9 then pass between a driven cutting wheel 14 having cutting blades 13 on the periphery of its surface and the cot roll 11 where the strands 9 are chopped into individual particulate strands 17. The contact between the driven wheel 14 and the cot roll 11 rotates the cot roll 11 and the contact between the cot roll 11 and the feed roll 10 rotates the feed roller 10. The cot roll 11 will be more fully described below.

The chopped strand 17 is then passed along a pair of vibratory conveyors 18 and 19, with vibratory conveyor 18 vibrating at a higher amplitude than vibratory conveyor 19. Located above vibratory conveyor 19 is a heater 25, such as an infrared heater, which heats and dries the chopped strands 17. At the end of vibratory conveyor 19 is a foraminous proportion 19a through which properly sized chopped strands 17 pass into collection container 21, with waste strands being discarded.

Figure 2:
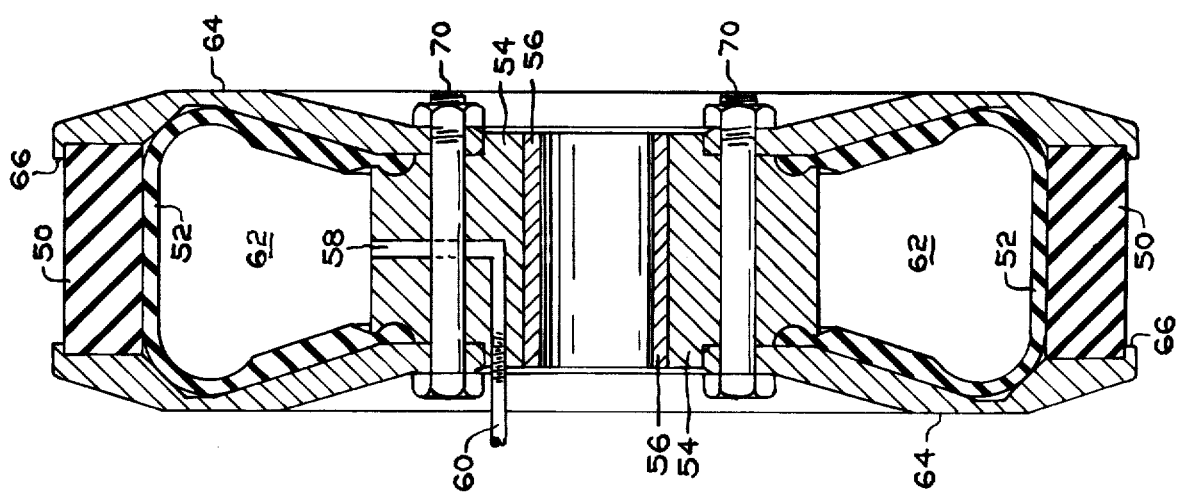
FIG. 2 is a cross-sectional view of the back-up or cot wheel employed in the present invention.

FIG. 2 illustrates the cot roll 11 employed in the present invention. The roll 11 has an annular cutting surface or ring 50 which contacts the strands 9 and cutting blades 13. The ring 50 is formed of a material such as natural rubber, synthetic rubber, polyurethane and the like and has a Shore A hardness preferably of between about 50 and 90. The ring 50 surrounds a expandable wheel 52. The wheel 52 is a preferably hollow wheel formed of a material such as rubber and the like which may be expanded under fluid pressure. The wheel 52 surrounds a hub 54 having inner bushing 56 therein which surrounds a shaft (not shown) on which the roll 11 is mounted onto the chopper 24. Located within the hub 54 is a fluid inlet 58. This inlet 58 is connected to a valve 60 through which fluid may enter the inlet 58. Liquid fluids such as water may be employed, however, gaseous fluids such as nitrogen, oxygen, carbon dioxide and especially air are preferably employed. The inlet 58 is connected in fluid transfer relation to chamber 62. Upon flowing fluid through valve 60 and inlet 58, the fluid in chamber 62 expands the hollow wheel 52. Fluid pressures may range, for example, from about 15 to 50 pounds per square inch gauge (102,040 to 340,136 pascals). This wheel 52 expands and firmly conforms to the inner diameter of the ring 50. It can readily be seen that wheel 52 can be made to conform to various inner diameters of the ring 50 and thus that the inner diameter of the ring 50 need not be of an exact diameter, as was previously necessary with the solid metal wheel around which the ring 50 was previously carried.

Surrounding the hub 54, the wheel 52 and the ring 50 are a pair of face plates 64. These face plates 64 include edge portions 66 which partially enclose the ring 50. The edge portions 66 are located such that when the ring 50 firmly abuts them, the ring 50 is in proper contact or meshing position for chopping strands between the ring 50 and the cutting blades 13. This position is maintained by expanding the hollow wheel 52 such that the ring 50 tightly abuts the edge portions 66. The edge portions 66 are also located to maintain the spacing between the cutting surface 50 and the wheel 14 from which the blades 13 extend at a proper distance to enable strand to be properly chopped.

The ability to expand the wheels 52 to the point where the ring abuts the end portions 66 with some latitude allows the use of used and resurfaced rings 50. In use, the outer surface of the ring 50 becomes gouged and damaged by the cutting blades 13. Previously, after sufficient damage occurred, the ring 50 had to be discarded with a new ring 50 replacing it. With the present invention, since the expandable wheel 52 exerts pressure on the ring 50 to align the ring 50 with the edge portions 66, resurfaced rings 50 having a slightly thinner cross-section than new rings may also be employed. In addition, new rings which are of a smaller outer diameter than was previously necessary may be employed for the first time by employing the expandable wheel of the present invention. Both of these advantages decrease the cost per unit use time for cots and thus increases the efficiency of the system.

The ability to vary the pressure exerted on the ring 50, and thus to vary its resiliency, serves as additional function. The contact between the blades 13 and the ring 50 has been, in the past, a single line contact of a single blade 13 at one time. This causes deep gouges in the rings 50 and necessitates frequent replacement for the ring 50. In addition, vibrations may occur between the ring 50 and the blades 13.

By properly varying the resiliency of the rings 50 by controlling the fluid pressure within the wheel 52, the contact between the blades 13 and the ring 50 may be adjusted to provide for a plurality of blades 13 to be in contact with the ring 50 at any given time, by providing a flatter contact surface along the region of contact of the blades 13 with the ring 50. This gentler action reduces the severe gouging of the rings 50 and thus increase their life. This also reduces vibrations in the chopper and thus provides for smoother operation of the system.

The entire wheel structure 11 is held together by a plurality of bolts 70 around the hub 54. When replacement of the ring 50 is necessary, either for permanent replacement or for resurfacing, the operator deflates the wheel 52, removes the bolts 70 and one of the face plates 64, slides the ring 50 off the wheel 52 and replaces it, replaces the face plate 64 and the bolts 70 and expands the wheel 52.

From the foregoing, it is obvious that the present invention provides a method and apparatus for chopping glass strands which both increases the useable life of the cutting surface rings and allows for smoother operation of the chopping system.

While the present invention has been illustrated as a combination glass fiber forming and chopping operation, the invention may be employed in any chopping operation using a back-up roll and a chopping wheel, as, for example, in the chopping of previously fabricated and dried forming packages of glass strand.

While the invention has been described with reference to a specific embodiment thereof, it is not intended to be so limited thereby, except as set forth in the accompanying claims.

I claim:

1. In an apparatus for chopping glass strands comprising a first roll having a plurality of cutting blades around the periphery thereof and a second roll having a resilient cutting surface whereby said glass strands passing between the first and second rolls are chopped into particulate strands, and wherein said second roll comprises an annular cutting ring surrounding a core member the improvement wherein said core member includes means to introduce fluid under pressure to expand a peripheral suface of said member and thereby either firmly conform the member to the inner diameter of said cutting ring or vary the inner and outer diameters and/or resiliency of said annular cutting ring.

2. The apparatus of claim 1 wherein said fluid expandable core member comprises a hollow, rubber wheel and a fluid chamber connected to a fluid inlet means.

3. The apparatus of claim 1 further comprising a pair of face plates to retain and align said ring.

4. The apparatus of claim 1 wherein said ring is formed of a material selected from the group consisting of natural rubbers, synthetic rubbers and polyurethanes.

5. An apparatus for forming and chopping glass strands comprising a bushing through which filaments are attenuated, an applicator for applying binder and/or size to the filaments, a gathering shoe for combining the filaments into unified strands, a feed roll and a cot roll between which said strands pass, said feed roll and cot roll providing the attenuative forces to form said filaments, a cutting roll having a plurality of cutting blades on the periphery thereof for contacting said cot roll, said strand passing between said blades and said cot roll being chopped into particulate strands, means for heating and drying said chopped strands and means for collecting the resulting chopped strand, said cot roll comprising an annular cutting ring and a core member surrounded by said cutting ring, said core member including means to introduce fluid under pressure to expand a peripheral surface of said member and thereby either firmly conform the member to the inner diameter of said cutting ring or vary the inner and outer diameters and/or resiliency of said cutting ring.

6. The apparatus of claim 5 wherein said fluid expandable core member comprises a hollow, rubber wheel and a fluid chamber connected to a fluid inlet means.

7. The apparatus of claim 5 further comprising a pair of face plates to retain and align said ring.

8. The apparatus of claim 5 wherein said ring is formed of a material selected from the group consisting of natural rubber, synthetic rubbers and polyurethanes.

9. In a method of chopping glass fiber strands comprising passing the strands between a first wheel having an annular cutting surface and a second wheel having a plurality of cutting blades on the periphery thereof, whereby said strand is chopped between said cutting blades and said cutting surface, the improvement comprising providing a fluid expandable core member surrounded by said annular cutting surface and expanding a peripheral surface of said core member under fluid pressure to firmly conform to the inner diameter of said annular cutting surface and to provide a proper mesh between said cutting surface and said blades.

10. The method of claim 9 further comprising varying the resiliency of said annular cutting surface by expanding said core member under fluid pressure.

11. The method of claim 9 wherein said fluid expanding comprising providing an inflatable core surrounded by said annular cutting surface, a chamber surrounded by said core, and a fluid inlet means in fluid transfer relation with said chamber and passing a fluid through said inlet to said chamber to thereby expand said core.

12. In a method of chopping glass strands comprising attenuating filaments through bushing tips in a bushing, combining the filaments into a plurality of strands and passing the strands between a first wheel having a cutting surface and a second wheel having a plurality of cutting blades on its periphery, whereby said strands are chopped into particulate strands between said cutting blades and said cutting surface, the improvement comprising providing a fluid expandable core member surrounded by said annular cutting surface and expanding a peripheral surface of said core member under fluid pressure to firmly conform to the inner diameter of said annular cutting surface and to provide a proper mesh between said cutting surface and said blades.

13. The method of claim 12 further comprising varying the resiliency of said annular cutting surface by said expanding of said core member under fluid pressure.

14. The method of claim 12 wherein said fluid expanding comprises providing an inflatable core surrounded by said annular cutting surface, a chamber surrounded by said core and a fluid inlet means in fluid transfer relation with said chamber and passing a fluid through said inlet to said chamber to thereby expand said core.

* * * * *